United States Patent [19]

Di Pietro

[11] Patent Number: 4,542,313
[45] Date of Patent: Sep. 17, 1985

[54] MAGNETIC CORE SPACER WITH MEANS TO PREVENT ADVERSE VIBRATIONS THEREOF

[75] Inventor: Carlo R. Di Pietro, Hamilton, Canada

[73] Assignee: Westinghouse Canada Inc., Hamilton, Canada

[21] Appl. No.: 620,937

[22] Filed: Jun. 15, 1984

[30] Foreign Application Priority Data

Oct. 3, 1983 [CA] Canada ................................ 438193

[51] Int. Cl.[4] ........................ H02K 1/32; H02K 15/01
[52] U.S. Cl. ....................................... 310/65; 310/42; 310/216
[58] Field of Search ................... 310/42, 65, 216, 217, 310/218, 179

[56] References Cited

U.S. PATENT DOCUMENTS

| | | | |
|---|---|---|---|
| 595,364 | 12/1897 | Batchelder | 310/65 |
| 662,928 | 12/1900 | Geisenhoener | 310/65 |
| 714,881 | 12/1902 | Emmet | 310/65 |
| 934,369 | 9/1909 | Summers | 310/65 |
| 2,838,703 | 6/1958 | Balke | 310/42 |
| 3,171,996 | 2/1965 | Alger et al. | 310/65 |
| 4,362,960 | 12/1982 | Gillet | 310/65 |

Primary Examiner—Peter S. Wong
Assistant Examiner—D. L. Rebsch
Attorney, Agent, or Firm—E. H. Oldham

[57] ABSTRACT

A dynamoelectric machine includes a plurality of groups of assembled laminations, each having two opposed end walls with at least one of the end walls incuding a plurality of locating recesses and spacer engaging tabs. The groups of laminations are secured within the machine between two end clamps. A plurality of spacers securable between adjacent ones of the groups and between the groups and the clamps provides air vents within the machine. Each of the spacers includes a keying arm portion engagable with one of the locating recesses to position the spacer relative to one end wall. The spacer engaging tabs abut the spacers, when so positioned by the locating recesses, to prevent adverse vibrational movement of the spacers during machine operation.

9 Claims, 6 Drawing Figures

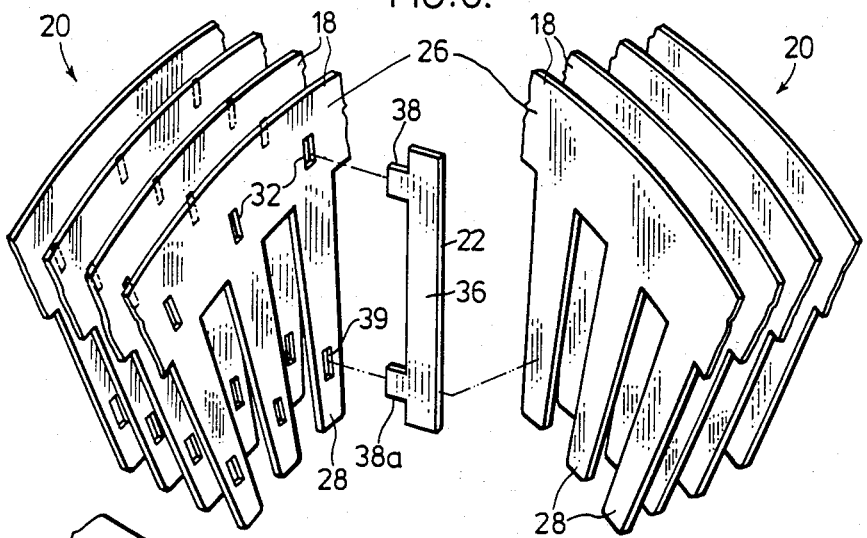
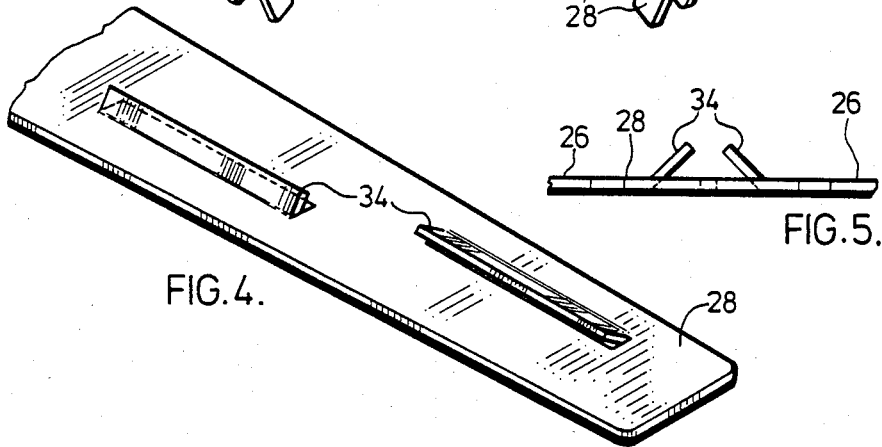
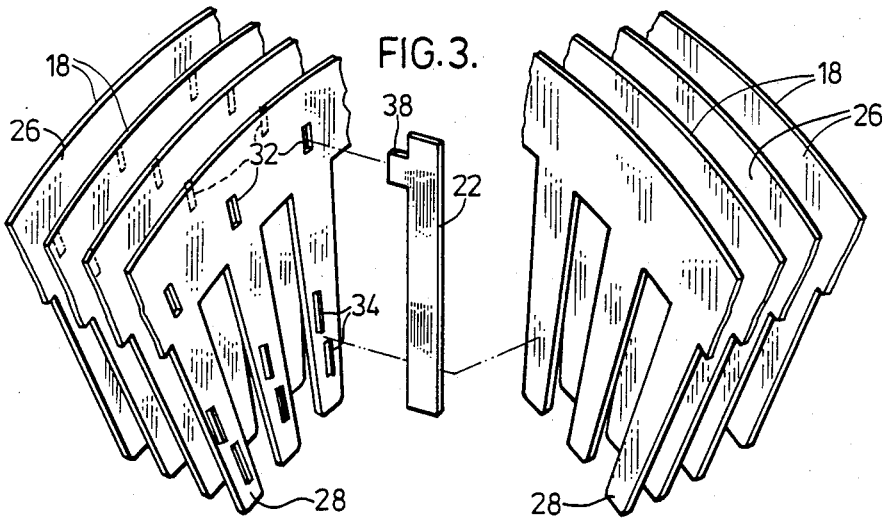

MAGNETIC CORE SPACER WITH MEANS TO PREVENT ADVERSE VIBRATIONS THEREOF

The present invention relates to the use of spacers in the cores of dynamoelectric machines to provide ventilation. In particular, the present invention relates to the retention of the spacers in the cores of the dynamoelectric machine.

In the construction of the stator and rotor cores of a dynamoelectric machine, the cores are formed by stacking laminations of magnetic steel together and compressing the laminations between end clamps or end plates. To provide for ventilation within the machine, the laminations are usually divided into groups. The groups are separated from each other by spacers such that air vents are provided between the groups.

During the construction of the core of the dynamoelectric machine, the spacers are positioned between the adjacent groups of laminations. Usually, as each group of laminations is completed, spacers are placed on the end wall of the group. Subsequent to this, additional laminations are stacked on or against the spacers to form the next group. During this operation it is necessary to positively locate the spacers so that they may support the group being formed thereagainst. In the past, the spacers have been positively located by means of spot welding the spacers to the end wall of an assembled group. As can be appreciated, a considerably large number of spacers are required between adjacent groups making the step of spot welding these spacers a time consuming operation.

In an attempt to reduce the amount of time involved in the assembly of these spacers, thereby reducing the labor cost for the manufacture of the dynamoelectric machine, a plurality of recesses are formed in the laminations adjacent one of the end walls of each group. The spacers have one outwardly extending arm portions which are inserted into the recesses. As a result, the assembly of the spacers is readily accomplished and thus eliminates the requirement for spot welding.

The problem with this method of assembly however, is that during machine operation, particularly machine start-up, should the end clamps holding the groups of laminations under compressing loosen slightly, the spacers vibrate. The vibration appears to be more severe for the spacers located between the end plates or end clamps and the exterior group of laminations of the core. The vibrational movement of the spacers has resulted in the spacer fracturing near its arm portion; the arm portion remaining secured in the recess. Once the spacer fractures, the fractured portion works its way towards the rotor of the machine eventually contacting the rotating rotor and resulting in this fractured portion being deformed against the stator coils. When the fractured portion contacts the stator coils it causes the coils to short circuit. The repair of a machine shorted in this manner is expensive and time consuming.

It is therefore an object of the present invention to provide a dynamoelectric machine having spacers that may be easily mounted therein during the construction of the machine and are not subject to the problems associated with fracturing of spacers mentioned above.

It is another object of the present invention to provide a dynamoelectric machine including spacers in the magnetic core which may be readily assembled in the core and allow for reliable machine operation.

In accordance with one aspect of the present invention, there is provided a dynamoelectric machine comprising a plurality of groups of assembled laminations. Each group includes two opposed end walls with at least one of the end walls including a plurality of locating means and spacer engaging means. The machine includes end clamp means for securing the groups in the machine. The machine further includes a plurality of spacers securable between the groups and the clamp means and between adjacent ones of the groups to provide air vents between adjacent end walls of the groups. Each of the spacers includes locating means engagable with one of the locating means to position the spacer relative to the one end wall. The spacer engaging means engage the spacers when so positioned by the locating means to prevent vibrational movement of the spacers during machine operation. By providing spacer engaging means in addition to the locating means, the present invention allows for the use of spacers which may be quickly and conveniently located relative to each group during machine construction and which are positively located at more than one position to prevent adverse vibrational movement of the spacers during machine operation.

Throughout the specification and claims the term "adverse vibrational movement" is mentioned. This term means vibrational movement of the spacers which could result in the spacers fracturing. It should be understood that the spacers may experience some vibrational movement.

The spacers may each include an elongate body portion such that the spacer engaging means engage opposing surfaces of the elongate body portion. Alternatively, the spacer engaging means may comprise a second plurality of locating means which engage at least two opposing surfaces of a second keying means of said spacer.

The spacer engaging means preferably comprises a pair of spaced apart tab members which extend outwardly from the one end wall of the group to engage opposing surfaces of the spacer. The spacers may extend inwardly towards each other at an angle of about 30 degrees from the one end surface such that the outer edges of the tab members engage the spacer. By angling the tab members at 30 degrees, the tab members are not bent at an excessive angle which may weaken the tab member at the bend. Further, a triangular effect is established between the tab members and the spacer to further enhance the ability of the tab members to secure the spacer from vibrational movement during machine operation.

In the preferred construction of the present invention, the spacers are located between adjacent groups of the stator core laminations and between the end plates and the group adjacent thereto. The stator core laminations comprise an annular portion provided with a plurality of inwardly and radially directed teeth. The tab members are positioned on the teeth and are radially displaced from each other so that the material strength of the teeth of the one end walls of the group is not significantly weakened.

In an alternate construction, the spacer engaging means may comprise a second plurality of recesses as said second locating means, each recess located in one of the inwardly and radially directed teeth. The spacer includes a second arm portion as the second keying means; the second arm portion being insertable into a second recess such that the spacer engaging means engages or matingly engages the spacer.

It should be understood that it is the combination of the keying means, recess means and the spacer engaging means to positively locate the spacer at more than one position that prevents the adverse vibrational movement of the spacer during machine operation.

While the preferred construction of the present invention employs the spacers between groups of the stator laminations of a dynamoelectric machine, it should be understood that the spacer of the present invention may be used in a rotor lamination of a dynamoelectric machine.

For a better understanding of the nature and objects of the present invention, reference may be had by way of example to the accompanying diagrammatic drawings in which:

FIG. 3 is an exploded perspective view showing a portion of the core laminations and a spacer of the dynamoelectric machine of the present invention;

FIG. 4 is a perspective view showing a tooth of the stator lamination including the spacer engaging means of the present invention;

FIG. 5 is an end view of the tooth of the stator lamination shown in FIG. 4; and FIG. 6 is a view similar to FIG. 3 showing an alternate construction incorporating the teachings of the present invention.

Referring now to FIGS. 1 through 5, the preferred embodiment of the present invention is described.

Figure 1:
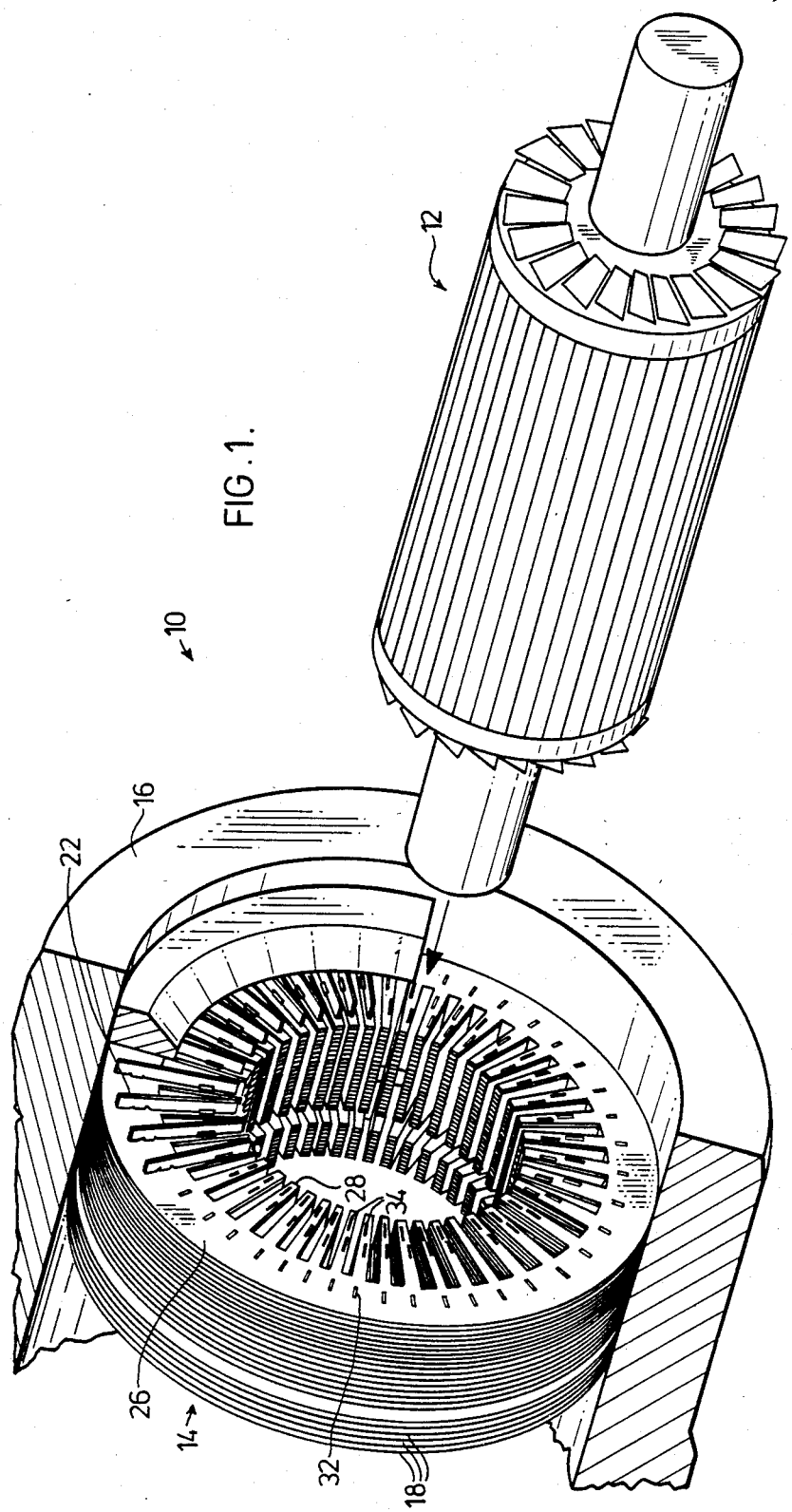
FIG. 1 is an exploded perspective view of a dynamoelectric machine of the present invention.
Figure 2:
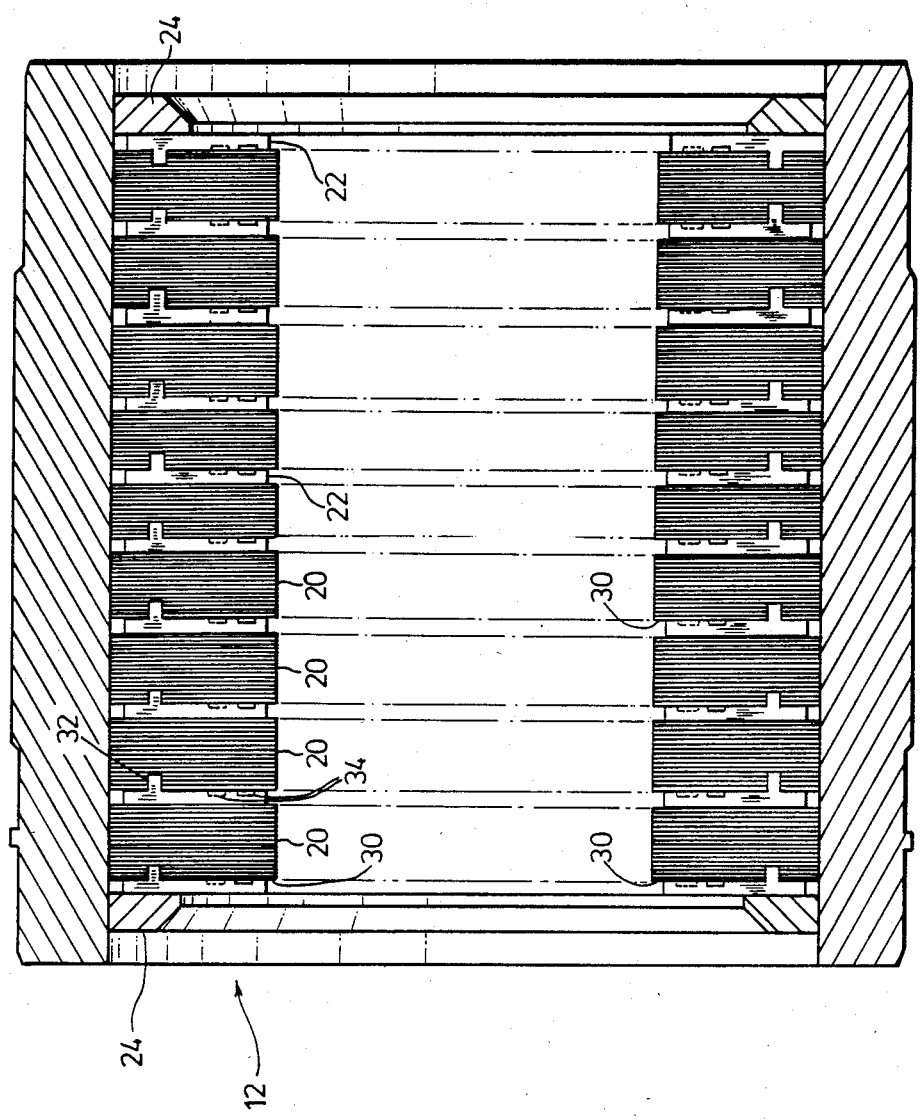
FIG. 2 is a side sectional view of the stator core of the dynamoelectric machine of the present invention.

In FIG. 1 there is shown a dynamoelectric machine 10 including a rotor 12 and a stator 14. The rotor 12 is "exploded" from stator 14 in this illustration. The stator 14 is housed within a casing 16 of the dynamoelectric machine. The stator comprises a plurality of magnetic laminations 18 which are assembled in a plurality of groups 20 of laminations 18. These groups 20 of laminations are separated from each other by spacers 22. Spacers 22 further separate the outer or outside groups 20 from the end clamp plate or clamp means 24 of the machine. The stator laminations 18 each comprise an annular body portion 26 having a plurality of radially and inwardly directed teeth 28. For the purpose of clarity in the drawings, the stator coils, which normally extend between the gaps shown between adjacent teeth 28 of laminations 18, have not been illustrated.

Each group 20 of the laminations comprises two opposed end walls 30. At least one of the end walls 30 is provided with a plurality of locating means 32 and spacer engaging means 34. The locating means 32 comprise a plurality of recesses stamped out from the laminations adjacent the one end wall 30. The recesses 32 are located on the annular body portion 26 of the stator laminations 18. The spacer engaging means comprise tab members 34 which are indents turned outwardly away from the teeth 28 of the one end wall or end lamination 30 of the group 20. The tab members 34, as shown in FIG. 5, extend at an angle of about 30 degrees from the one end wall towards each other. The pair of tab members 34 are radially displaced from each other along the tooth 28. The purpose of the radial displacement of the tab members 34 is to provide sufficient material across the width of tooth 28 such that the strength of the tooth is maintained. Further, the tab members 34 preferably extend at an angle less than 90 degrees of the one end wall 30 for two reasons. First, in view of the brittleness of silicon coated steel, the material used for the core laminations, tab members bent at right angles may fracture under loading conditions. It should be understood that the angle of tab 34 is dependent upon the strength of materials used for tooth 28. Secondly, by angling the tab members 34, they form a triangular formation with the spacer 22 enhancing the ability of the tab members 34 to secure the spacer 22 from adverse vibrational movement.

During the construction of the dynamoelectric machine, as the laminations 18 are stacked upon each other, a few laminations adjacent the one end wall 30 of the group are stacked with recesses 32 aligned above each other and the last lamination 18, forming the end wall of the group 30 is also provided with the tab members 34. Once a group 20 of laminations 18 is assembled, spacers 22 may be located relative to the group 20.

The spacer 22 includes an elongate body portion 36 and an arm portion or keying means 38. The arm portion 38 is inserted into recess 32 to matingly engage therewith. This results in the elongate body portion 36 orienting in a radial direction between the tab members 34 such that the outer edges 38 of the tab members 34 abut opposing surfaces of the spacer 22. By positively locating the spacer at more than one location, namely on the annular portion of the group and the teeth portion of the group, the spacers are prevented from vibrating. During the assembly of further groups of laminations, the laminations are stacked on or against the spacers as shown in FIG. 3.

It should be understood that in other alternate embodiments, the spacer comprises one arm portion for the spacer and two sets of opposing tab members may be provided adjacent walls. Other combinations are available including the use of more than two outwardly extending tab members on each tooth of the end wall.

A further alternative as shown in FIG. 6 illustrates a spacer 36 having two arm portions 38 and 38A and locating holes or recesses 39 in stator teeth. The arm portion 38A comprises a second keying means which is insertable into recess or spacer engaging means 39.

The embodiment of the invention in which an exclusive property or privileged is claimed are defined as follows:

1. A dynamoelectric machine stator comprising:
a plurality of groups of assembled laminations, each group including two opposed end walls, at least one of said end walls including a plurality of locating slots and spacer engaging means formed therein:
end clamp means for securing said groups in said machine; and
a plurality of magnetic spacers secured between said groups and said clamp means and between adjacent ones of said groups to provide air vents between adjacent walls of said groups; each of said spacers including tongue means engageable with one of said locating slots to position the spacer relative to the one end wall, and said spacer engaging means including a pair of opposing raised tangs located in each tooth portion of end wall laminations for engaging said spacers between said pair of opposing raised tangs to prevent adverse vibrational movement of said spacers during machine operation.

2. A dynamoelectric machine stator including:
a plurality of groups of stacked magnetic laminations, each group having two opposed end walls and comprising an annular portion having a plurality of radially and inwardly directed teeth, at least one of the end walls including a plurality of recesses extending into said annular portion above said teeth, said at least one end wall including a plurality of pairs of spaced apart opposing raised tang members extending outwardly from the teeth of said one end wall such that there corresponds at least one pair of raised tang members for each of said recesses;

two end plates securing said groups in said machine stator; and, a plurality of magnetic spacers, each spacer including an elongate body portion and an arm portion, said arm portion being insertable into one of said recesses to positively locate said elongate body portion against the tooth of said one end wall such that opposing surfaces of said body portion are engaged by the opposing raised tang members extending from said tooth to prevent adverse vibrational movement of said spacer during machine operation, whereby said spacers separate said groups from said end plates and from each other to provide air vents between adjacent end walls of said groups.

3. A dynamoelectric machine stator as claimed in claim 1 wherein said magnetic spacers each include an elongate body portion, wherein said spacer engaging means and said tongue means are remotely located near the ends of said elongate body portion of said spacer.

4. A dynamoelectric machine as claimed in claim 3 wherein said pair of opposing raised tangs extend radially beside said spacers and said raised tangs extend inwardly toward each other at an angle of about 30° degrees from the surface of the one end wall such that outer edges of said raised tangs engage said spacers.

5. A dynamoelectric machine as claimed in claim 4 wherein said raised tangs are radially displaced.

6. A dynamoelectric machine stator as claimed in claim 5 wherein each said spacer includes, as said tongue means, an arm portion extending away from said elongate body portion, said locating slots each comprising a recess which extends into the one end wall of the group, said arm portion being insertable into said recess to matingly engage therewith such that said elongate body portion is oriented in a radial direction within said machine stator.

7. A dynamoelectric machine stator as claimed in claim 1 wherein each of said groups comprise an annular portion having a plurality of radially extending teeth.

8. A dynamoelectric machine stator as claimed in claim 7 wherein said locating slots comprise a plurality of recesses extending into the annular portion of said groups at predetermined positions above said teeth, said tongue means being insertable into said recesses.

9. A dynamoelectric machine according to claim 8 wherein said spacer engaging means are spaced on said teeth radially from said recesses and engage opposing surfaces of said spacer when said tongue means are inserted into said recesses.

* * * * *